US005953639A

United States Patent [19]
Weiss et al.

[11] Patent Number: 5,953,639
[45] Date of Patent: Sep. 14, 1999

[54] MULTI-BEAM ENCODING SYSTEM FOR TWO-WAY PAGING

[75] Inventors: Anthony J. Weiss, Tel Aviv; Yair Karmi, Rishon Lezion, both of Israel; Ilan Zorman; Haim Harel, both of Palo Alto, Calif.

[73] Assignee: Wireless Online, Inc., Los Altos, Calif.

[21] Appl. No.: 08/861,455

[22] Filed: May 22, 1997

[51] Int. Cl.$^6$ .................................................. H04Q 7/06
[52] U.S. Cl. .................. 455/38.1; 455/509; 455/517; 455/526; 455/456; 340/825; 340/44
[58] Field of Search .................. 455/38.1, 31.2, 455/31.3, 509, 560, 561, 562, 456, 457, 433, 422, 447, 526, 517, 227; 340/825.44

[56] References Cited

U.S. PATENT DOCUMENTS

| | | | |
|---|---|---|---|
| 4,882,588 | 11/1989 | Renshaw et al. | 342/373 |
| 5,073,971 | 12/1991 | Schaeffer | 45/447 |
| 5,111,197 | 5/1992 | Ichikawa | 455/31.2 X |
| 5,369,681 | 11/1994 | Boudreau et al. | 379/87 |
| 5,448,751 | 9/1995 | Takenaka et al. | 455/450 |
| 5,648,784 | 7/1997 | Shaw et al. | 342/373 |

OTHER PUBLICATIONS

Balanis, C.A., in: Antenna Theory, Analysis and Design, Harper and Row, Inc., pp. 679–685 and 698–699 (1982).
Mailloux, R.J., in: Phase Array Antenna Handbook, Artech House, Inc., pp. 13–20, 438–445, and 521–524 (1994).
Motorola, Inc. Semiconductor Technical Data, FLEXchip Signal Processor, Publication No. MC68175/D 109 pages (1996).
Motorola, Inc. FLEXstack One Way Software Development Kit, Version 2.0, 66 pages (Dec. 13, 1996).
Motorola, Inc., Flexible High Speed Paging Protocol Benchmarking, 16 pages (Apr. 26, 1994).
Motorola, Inc., FLEX Protocol's Operational Capabilities for Local, Regional, Nationwide and Global Roaming–Preliminary, 32 pages (Jul. 18, 1995).
Motorola, Inc., Typical FLEX Pager Block Diagram with FLEXstack, 1 page (Mar. 27, 1997) www.mot.com/SPS/DSP/flexchip/.
Texas Instruments TMS30FLEX1 Chipset Product Brief, 3 pages (Mar. 27, 1997) www.ti.com/sc/docs/wireless/page-.htm.
Texas Instruments Press Release, "TI Chip Set Supporting FLEX Messaging Protocol Now Available" 2 pages (Nov. 11, 1996) www.ti.com/sc/docs/news/1996/96070.htm.
Texas Instruments, TLV5591 Data Manual for FLEX Decoder, Appendix A and B, 22 pages (Apr. 17, 1996).

*Primary Examiner*—Wellington Chin
*Assistant Examiner*—Philip J. Sobutka
*Attorney, Agent, or Firm*—Townsend and Townsend and Crew; Kenneth R. Allen

[57] ABSTRACT

In the context of a multi-channel paging system, a method and system for assigning a transmission time and a transmission channel to a pager message responsive to the location of the target of the pager message. This facilitates operation of a multi-pager system wherein different pagers are reachable on different channels and/or at different times depending on the location of the pager. Such a system greatly increases capacity over a conventional omnidirectional system.

13 Claims, 5 Drawing Sheets

| Encoder | Frame No. | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1 | 12 | 13 | 3 | 3 | N | N | N | N | N | N | 13 | 3 | N | N | N | N |
| 2 | 23 | 16 | 7 | N | N | N | N | N | N | N | 16 | 7 | N | N | N | N |
| 3 | 28 | 22 | 20 | N | N | N | N | N | N | N | 22 | 20 | N | N | N | N |
| 4 | 6 | 9 | 26 | N | N | N | N | N | N | N | 9 | 26 | N | N | N | N |
| 5 | 1 | 3 | N | N | N | N | N | N | N | N | 3 | N | N | N | N | N |
| 6 | 21 | 21 | N | N | N | N | N | N | N | N | 21 | N | N | N | N | N |
| 7 | 17 | 10 | 15 | 15 | N | N | N | N | N | N | 10 | 15 | N | N | N | N |
| 8 | 4 | 7 | 19 | 20 | N | N | N | N | N | N | 7 | 19 | N | N | N | N |

FIG. 5

MULTI-BEAM ENCODING SYSTEM FOR TWO-WAY PAGING

STATEMENT OF RELATED APPLICATIONS

The present application is related to the subject matter of a co-assigned application, U.S. patent application Ser. No. 08/808,347 entitled VERSATILE ANTENNA ARRAY FOR MULTIPLE PENCIL BEAMS AND EFFICIENT BEAM COMBINATIONS, and filed on Feb. 28, 1997, the contents of which are herein incorporated by reference. The present application is also related to the subject matter of another co-assigned application, U.S. patent appliction Ser. No. - - - entitled METHOD AND APPARATUS FOR ADAPTING OMNIDIRECTIONAL SYNCHRONOUS WIRELESS COMMUNICATIONS PROTOCOL TO SECTORIAL ENVIRONMENTS, filed on the same day as the present application, the contents of which are herein incorporated by reference.

BACKGROUND OF THE INVENTION

The present application relates to a system for distributing messages to pagers, and more particularly to a system for distributing messages to pagers in a multi-channel system where not all channels may be used simultaneously with all other channels.

Typical paging systems operate using a synchronized set of omnidirectional (or wide sector) transmitters distributed over a service area. Each omnidirectional transmitter simultaneously broadcasts (simulcasts) to all the pagers in a region surrounding it. Although, each pager located in the region may receive each broadcast, some messages may be addressed to a particular pager and only this pager will listen or take action in response to the received message. Some protocols such as FLEX from Motorola of Schaumburg, Ill. specify that pagers only wake up at certain intervals and the pager transmitter must take into account the wake up time of a particular pager when deciding the time to direct a message to it.

Multi-channel approaches to operating a pager transmitter are however also possible. Co-assigned U.S. patent application Ser. No. 08/808,347 discloses a paging system that replaces the prior art omnidirectional approach with a multi-beam transmission scheme wherein a single transmission site transmits over multiple beams on a single frequency with the beams being isolated from one another so that different beams may simultaneously carry different signals over the same frequency. This approach greatly increases the amount of message traffic that can be accommodated using a single transmitter site on a single frequency.

However, one can see that the task of scheduling and controlling the transmission of a message addressed to a particular pager is now much more complicated since not only the transmission time must be selected but the correct beam must also be selected. The task is further complicated by antenna design constraints which prevent certain beams from being used simultaneously with certain other beams to carry different signals.

SUMMARY OF THE INVENTION

In the context of a multi-channel paging system, the present invention provides a method and system for assigning a transmission time and a transmission channel to a pager message responsive to the location of the target of the pager message. This facilitates operation of a multi-pager system wherein different pagers are reachable on different channels and/or at different times depending on the location of the pager. Such a system greatly increases capacity over a conventional omnidirectional system.

In accordance with a first aspect of the invention, a system is provided for use in a pager network wherein a plurality of pager receivers are directly accessible from a common pager transmitter site via a plurality of channels, any selected one of the pager receivers being accessible or inaccessible via any one of the plurality of channels depending on a location of the selected one of the pager receivers. This system allocates paging messages among channels. This system includes a controller that maintains a location database recording locations of the plurality of pager receivers and a switch. The switch receives a plurality of pager messages addressed to particular ones of the pager receivers and assigns channels and transmission times to the plurality of pager messages responsive to locations of the plurality of pager receivers as recorded in the location database.

A further understanding of the nature and advantages of the inventions herein may be realized by reference to the remaining portions of the specification and the attached drawings.

BRIEF DESCRIPTION OF THE DRAWINGS

FIG. 5 depicts a matrix storing a switching plan for allocating messages among available transmission channels and transmission times in accordance with one embodiment of the present invention.

DESCRIPTION OF SPECIFIC EMBODIMENTS

Prior Art Pager network and Infrastructure

An understanding of the invention will be aided by first examining a conventional pager network and supporting infrastructure.

Figure 1:
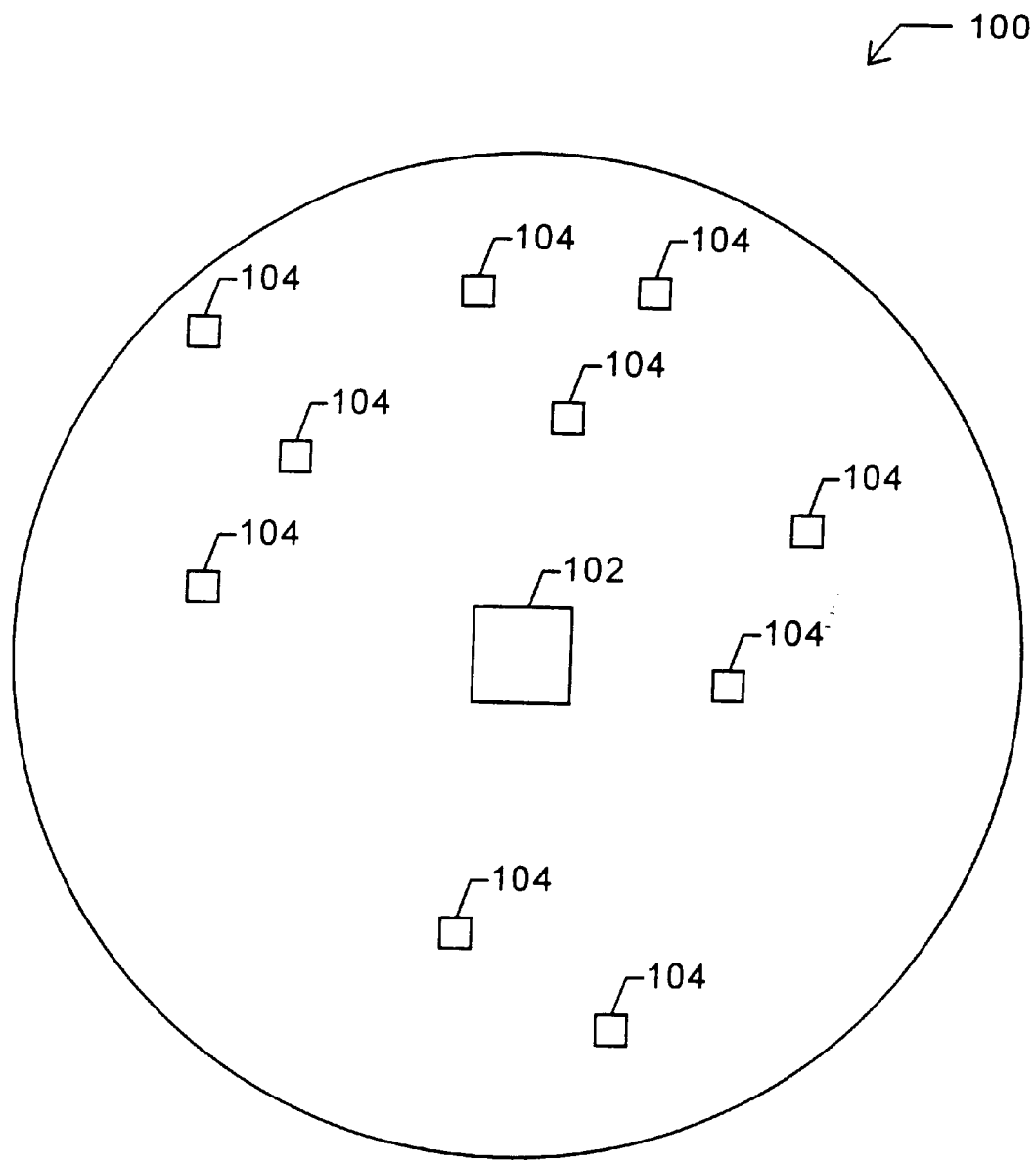
FIG. 1 depicts a prior art omnidirectional pager network including a pager transmitter site and a plurality of pager receivers.

FIG. 1 depicts a prior art omnidirectional pager network 100 including a pager transmitter site 102 and a plurality of pager receivers 104. Transmitter site 102 utilizes a single frequency to transmit messages to a plurality of pager receivers 104. Every pager receiver 104 is capable of hearing whatever is transmitted by transmitter site 102 on the single frequency. Some messages are addressed to particular pager receivers, while others may be addressed to groups of pager receivers, or to all of them.

A protocol specifies the interaction between pager transmitter site 102 and pager receivers 104. Examples of such protocols include the FLEX™ protocol and other related protocols of the FLEX family such as REFLEX, a FLEX protocol modified for use in a two way pager network. Aspects of the FLEX protocol are described in the FLEX Protocol Specification and FLEX Encoding and Decoding Requirements, Document Number FLEX-93001, available from Motorola, Inc. of Schaumburg Ill. The contents of this reference document are incorporated herein by reference.

A characteristic of the FLEX protocol is that transmissions from transmitter site 102 are divided in the time domain into fixed length cycles, each cycle lasting four minutes. Each cycle includes 128 frames, numbered 0 through 127. Each individual frame in turn includes a synchronization portion giving synchronization information, a block information field for determining time and date information and certain paging system information, an address field including addresses assigned to pager receivers whose messages are in the frame, a vector field, and a message field. The vector field includes pointers to messages in the message field, or for certain messages, the entire message.

For power conservation reasons, the FLEX protocol provides for pager receivers to "wake up" to receive only predetermined frames in the cycle and to stay in a low power consumption mode during other frames. Thus, pager transmitter site 102 takes into account the scheduled wake-up times 104 in determining when to schedule transmissions to individual pager receivers.

FIG. 1 shows a pager network with a single transmitter site but it will be understood that many transmitter sites may operate in parallel, each site being used to access a particular area surrounding the site. Each site typically transmits the same information simultaneously, although in two-way systems, once the location of a particular pager receiver is established, transmissions targeted for that receiver may be transmitted only from a nearby transmitter site or sites. Where sites are spaced closely enough that a single pager receiver may receive transmissions from multiple sites, the sites must be synchronized among themselves to avoid destructive interference.

Figure 2:
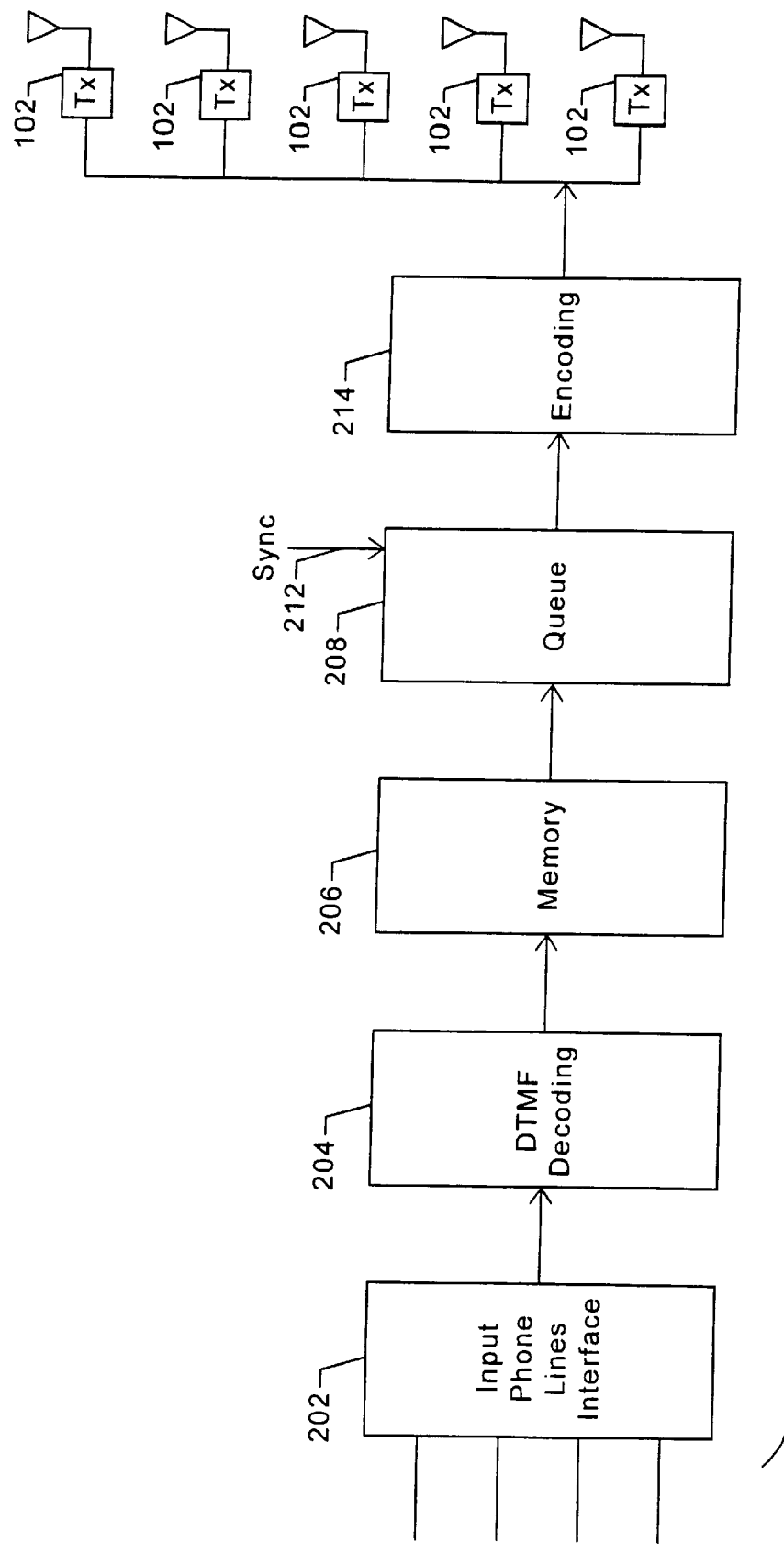
FIG. 2 depicts infrastructure for a prior art omnidirectional pager network.

FIG. 2 depicts infrastructure for a prior art omnidirectional pager network. Requests for paging access come in via the public switched telephone network (PSTN) to a phone line interface 202. Alternative sources for paging access requests include ISDN lines., Frame relay lines, the Internet, etc. The requests identify a pager to be accessed and any message to be transmitted to the pager. In the depicted infrastructure, the messages are numeric and the requests are typically in the form of DTMF tone sequences. A DTMF tone decoder 204 extracts from the request tones the addresses of the pagers to be accessed and the message contents, if any. DTMF tone decoder 204 stores the addresses and messages in a memory 206. Of course, it is also possible to have alphanumeric messages. Then the requests will arrive in the form of modulation on a carrier and a modem will substitute for DTMF tone decoder 204.

A queue 208 then schedules the transmissions for broadcast, assigning each message a frame number within the 128 frame cycle depending on the known wake up times of the targeted pagers. The wake up times may be known from manual entry of pager characteristics. Queue 208 outputs the messages in order of scheduled transmission to a timing block 210 along with the scheduled transmission frame.

Encoder 214 translates the message data into frames according to the pager network protocol such as FLEX. A single frame may include more than one message to be transmitted. Alternatively, a message may extend over more than one frame. Encoder 214 outputs the messages to multiple co-synchronized transmitter sites 102. Encoder 214 outputs the frames at an exact time under the control of a synchronization signal 212.

Multi-Channel Pager network and Infrastructure in Accordance with the Invention

Figure 3:
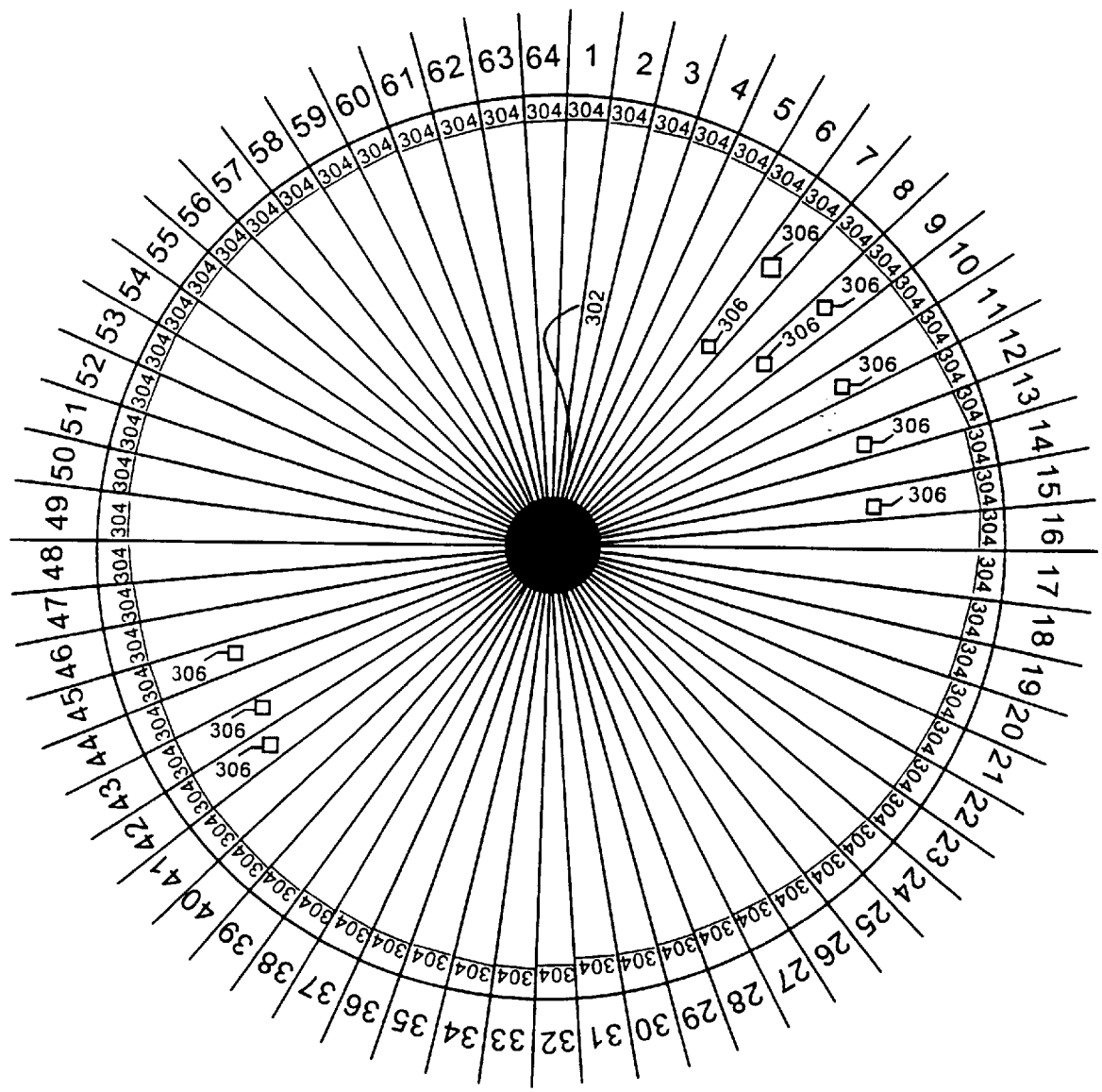
FIG. 3 depicts a multi-beam pager network wherein a region surrounding a pager transmitter site is divided into sectors.

FIG. 3 depicts a multi-beam pager network 300 using a multi-beam transmission scheme described in U.S. patent application Ser. No. 08/808,347. A pager transmitter site 302 is equipped with an antenna system that outputs 64 different beams, approximately evenly spaced from each other around transmitter site 302. Each beam defines a different sector 304 of the region surrounding site 302. A plurality of pager receivers 306 are distributed throughout the various sectors.

Beams that are not adjacent to one another may carry disparate signals on the same frequency at the same time without interfering. However, when adjacent beams operate simultaneously on the same frequency, they should carry identical signals to avoid destructive interference. Although FIG. 3 depicts 64 beams, the present invention does not require any particular number of beams. In a preferred family of embodiments, the number of beams is between 8 and 128.

Also, FIG. 3 depicts the beams transmitted for a particular frequency. The present invention encompasses both single and multiple frequency embodiments. Using more than one frequency increases system capacity at the expense of greater spectrum usage and subscriber unit complexity.

When individually addressed messages are to be sent to pager receivers 306, pager transmitter site illuminates the various sectors over time in such a way that adjacent beams operating on the same frequency do not carry disparate signals. However, when messages are to be sent to all pager receivers ("simulcast" messages), all sectors may be illuminated simultaneously with the same signal.

It can be seen that messages targeted to individual pager receivers should be designated for particular beams depending on the location of the targeted pager receiver. Also, although pager receivers in disparate sectors may be addressed simultaneously, pager receivers in a particular sector should not be addressed simultaneously with pager receivers in a sector adjacent to the particular sector. Accordingly, the prior art pager network infrastructure depicted in FIG. 2 is inadequate since it takes neither of these concerns into account.

Figure 4:
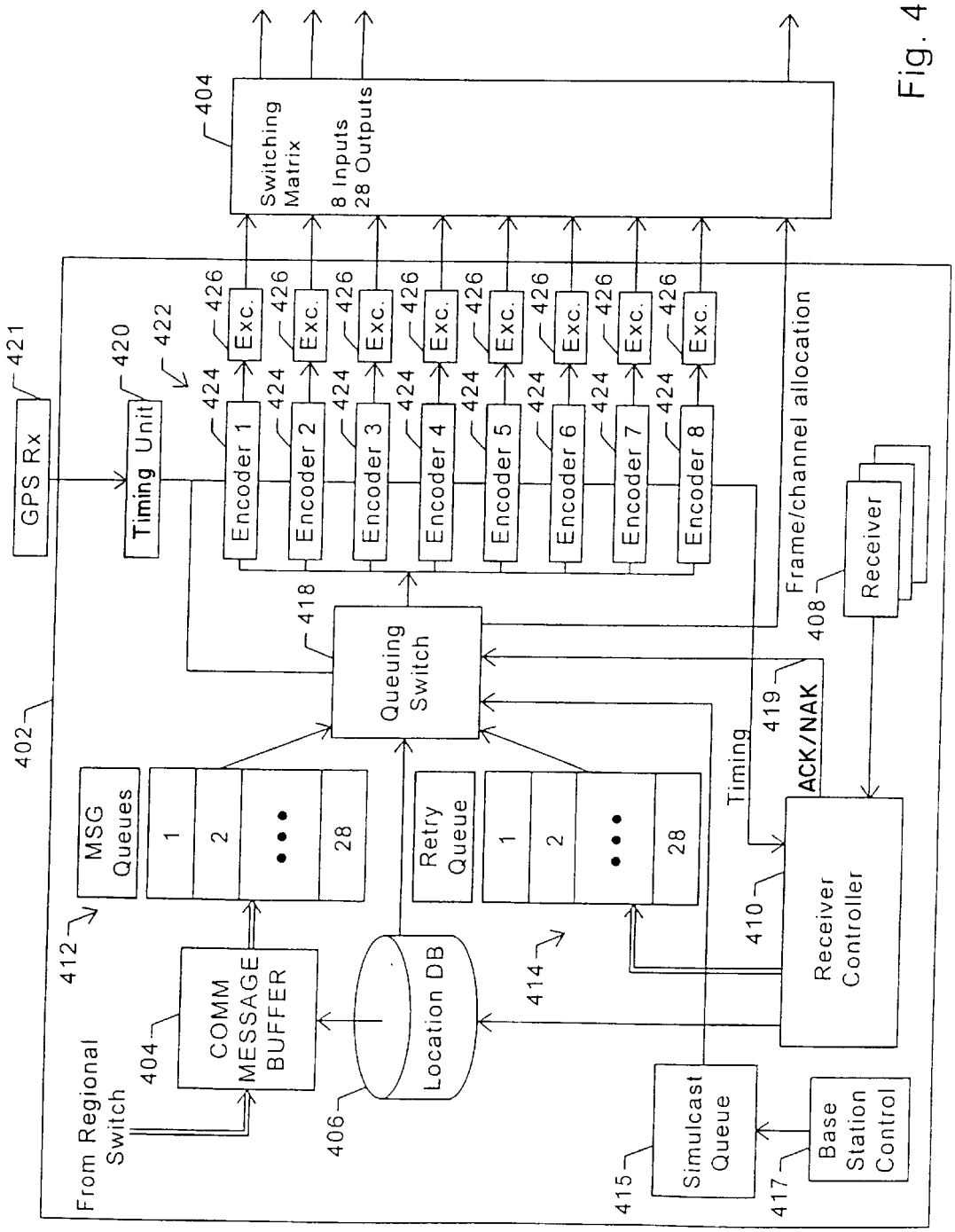
FIG. 4 depicts infrastructure for a multi-beam pager network in accordance with one embodiment of the present invention.

FIG. 4 depicts infrastructure for a multi-beam pager network in accordance with one embodiment of the present invention. Pager transmitter site 302 includes a switch 402. Switch 402 receives pager message data and addresses from a regional switch and outputs signals corresponding to individual beams through a switching matrix 404. The pager messages are allocated to pager transmitter site 302 depending on the locations of targeted pager receivers and site load. These messages are received using an inter-switch communication protocol such as TNpp, WMtp, or some other protocol. A communication message buffer 404 receives the message data from the regional switch. For each message received, a pager address, sometimes referred to in FLEX applications as a CAP code, is also received. Communication message buffer 404 accesses a location database 406 to look up the pager address and identify a channel number for the address. In a preferred embodiment, this channel number indicates which sector of the region surrounding pager transmitter site 302 contains the addressed pager receiver.

One embodiment assumes a two-way paging system where pagers contact any pager transmitter site 302 that hears them, after being requested to do so. Once this is done, the system is aware of which pager transmitter site 302 can be used to reach an individual pager and on which beam. Each beam feeds a receiver from among receivers 408. In some embodiments, each beam has its own receiver. In other embodiments, the number of receivers is less than the number of beams and there is switching to change the assignments of receivers to beams over time. A receiver controller 410 identifies the sector containing the pager by determining which receiver receives the pager's reporting message with the greatest signal strength. It will of course be understood that due to interference and various propagation effects, receiver controller 410 may determine that a pager is effectively in a sector different than the one that would be suggested by the pager's geographic location. The location information collected by receiver controller 410 thus should be considered to an effective location or estimated location. Receiver controller 410 stores this location information in location database 406. The present invention, however, is not limited to this type of registration and location database 406 may learn of pager locations in any way.

A set of message queues 412 receive the messages from communication message buffer 404. Each message queue corresponds to one of the 64 beams or channels. Each message goes into the queue corresponding to the sector effectively containing the targeted pager receiver. Within the queue, the messages are divided into packets. In the preferred embodiment, there is also a parallel set of retry queues 414. Retry queues 414 include pointers to messages in the message queues that have already been transmitted to pager receivers but whose successful receipt was not confirmed. In some instances, the pointers in retry queues 414 will indicate that it is known that the targeted pager receiver has moved to a new sector.

A simulcast queue 415 which includes message packets that are intended to be transmitted to all sectors simultaneously. Simulcast queue 415 receives its message packets from a base station control unit 417. A final source of message packets for queueing switch 418 is an acknowledgement/non-acknowledgment (ACK/NAK) signal line 419 generated by receiver controller 410. (ACK/NAK) signal line 419 tells queue switch 418 to send messages to individual pager receivers acknowledging or not acknowledging successful receipt of inbound messages.

The outputs of message queues 412 and retry queues 414 are inputs to a queuing switch 418. Queuing switch 418 assigns a transmission time to each message packet. The preferred embodiment operates according to the FLEX protocol and the transmission times are specified as particular FLEX frames within which the message is to be transmitted. Queuing switch 418 releases each message at a time corresponding to its assigned transmission time. Queuing switch 418 derives its timing from a timing unit 420.

Queuing switch 418 takes into account several factors in assigning frames to outgoing messages. For example, messages should be addressed to particular pagers only during frames when they are scheduled to be awake. This wake-up information is stored in location database 406. One rule is that pagers in interfering sectors may not receive non-simulcast messages simultaneously. For a preferred antenna configuration, sectors that are adjacent to one another are considered to be interfering but any sectors not adjacent to one another are non-interfering. Thus, the scheduling of messages depends on location and not all beams are activated simultaneously during non-simulcast transmission periods. Queuing switch 418 selects a beam activation strategy that optimizes system capacity and message latency.

Retry messages, generally being only message segments rather than full messages and also representing delayed communications, are granted higher priority. In general, very short protocol control messages are granted high priority. Simulcast messages are typically transmitted at regular intervals as explained in the co-filed and co-assigned application entitled METHOD AND APPARATUS FOR ADAPTING OMNIDIRECTIONAL SYNCHRONOUS WIRELESS COMMUNICATIONS PROTOCOL TO SECTORIAL ENVIRONMENTS.

In the preferred embodiment, queuing switch 418 has 8 parallel outputs. Each output corresponds to a particular beam, although which output corresponds to which beam may change from frame to frame. The outputs feed an encoding system 422 which includes an encoder 424 for each output. The outputs pass either the messages themselves or pointers to the message data. The transfer of message data from queuing switch 418 to encoders 424 is preferably carried out with a lead time, to ensure that encoders 424 have sufficient time to complete the FLEX encoding process. This provides high throughput without including large buffers within encoders 424. It is possible to implement encoders 424 as a single unit with a single input.

The interface between queuing switch 418 and encoders 424 may be, e.g., a series of RS-232 connections, an RS-422 connection, an Ethernet connection, or a parallel bus. Queuing switch 418 need to be at the same physical location as encoders 424.

Each message transferred to encoders 422 is frame tagged with the frame tag indicating the frame number when the message should be transmitted. The frame tag also includes the frame when the message can be continued. This tagging provides some flexibility to make the system robust in case the post encoding number of bits available for a message within a frame are different than estimated by queuing switch 418. Encoders 422 update queuing switch 418 with the actual frame status to prevent accumulation of estimation errors and to prevent queuing switch 418 from scheduling messages for frames taken up by continuations of messages that began in previous frames. In an alternative embodiment, when the message size exceeds an allocated frame, the assigned encoder deletes the message segment that does not fit from its input and this segment is sent to retry queues 414.

Encoders 424 preferably use a common timing signal generated by timing unit 420 to determine exactly when to output each frame. Timing unit 420 receives timing signals from a GPS receiver 421. GPS receiver 421 provides timing unit 420 with a 1 pulse per second signal accurate to within 1 microsecond and an RS-232 serial data line carrying absolute time information. From these signals, timing unit 420 generates a baud rate clock and a frame clock to provide synchronization to queuing switch 418, encoders 424, and receiver controller 410. Timing unit 420 may also output a current frame number or this may be provided by queuing switch 418. In an alternative embodiment, there is no timing unit 420. Encoders 424 then derive the baud rate clock and frame clock themselves from outputs of GPS receiver 421.

Encoders 424 preferably output data at 6400 bps, although other output rates are possible. The output of each encoder 424 includes two parallel data lines for four level coding, a clock and a key. These outputs are the inputs to exciters 426 which are preferably 4-level, 3200 baud/6400 bps FLEX exciters. The key signal is used to inform the exciter when to transmit and when to shut off.

FIG. 5 depicts a table storing a switching plan for allocating messages among available transmission channels and transmission times in accordance with one embodiment of the present invention. Queuing switch 418 develops the matrix of FIG. 5 to plan the usage of the various encoders and beams. Each column corresponds to one of sixteen planned frames. Each row specifies one of encoders 424. The entries in the table identify which channel (beam) is to carry the designated frame output by the designated encoder.

To economize on encoder and exciter hardware, the number of encoders and exciters is less than the number of channels or beams. To map exciter outputs to beams, switching matrix 404 is provided. Switching matrix 404 has an input for each encoder and an output for each beam. Switching matrix 404 maps inputs to outputs in accordance with information from the table of FIG. 5 as received from queuing switch 418. In an alternative embodiment, the number of encoders is the same as the number of beams and no switching matrix is necessary.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

For example, the number of beams may be varied. Also, more than one frequency may be used so that when channel is specified, this implies selection of a beam and a frequency. Alternatively, the infrastructure of FIG. 4 may feed an alternative arrangement of transmitters and/or antennas so that pager receiver location is used to specify a transmitter location rather than a beam, or a combination of transmitter location and beam.

What is claimed is:

1. For use in a two-way paging network system wherein a plurality of two-way pager units is directly accessible from a common pager transmitting site via a plurality of directional beams produced by transmitters and directional antennas, each of the directional beams being assigned to a single angular sector, any selected one of said pager units being accessible via at least a first one of said plurality of directional beams and being inaccessible via at least a second one of said plurality of directional antennas depending on a location of said selected one of said pager units, a system for allocating resources to support a simultaneous plurality of pager messages among directional beams sharing a common frequency, said system comprising:

a controller that maintains an updatable location database, said controller recording estimated angular locations of said plurality of pager units relative to said transmitting site in response to current information from said plurality of pager units; and a switch that 1) receives a plurality of pager messages addressed to particular ones of said pager units; and
2) assigns said directional beams and transmission times to said plurality of pager messages responsive to estimated locations of said plurality of pager units as recorded in said location database to promote simultaneous transmission of said plurality of messages on said common frequency.

2. The two-way system according to claim 1 wherein said switch also assigns beams and transmission times responsive to wake-up times of said pager units as recorded in said location database.

3. The two-way system of claim 1 wherein said switch assigns directional beams and requires that said pager which are located in a particular sector cannot be accessed simultaneously with said pager which are located in another sector adjacent to said particular sector.

4. The two-way system of claim 1 wherein said switch assigns directional beams and transmission times to said plurality of pager messages in accordance with a rule that requires that pager units located in a particular sector cannot be accessed simultaneously with pager units located in another sector whose beam would substantially interfere with transmissions to said particular sector.

5. The two-way system of claim 1 further comprising an encoder system, said encoder system receiving said plurality of messages and current angular location information about said pager units for converting said plurality of messages to pager protocol frames and for directing selected pager protocol frames to specific pager units.

6. The two-way system of claim 5 wherein said encoding system includes an encoder for each available output and wherein said pager protocol frames are frames formatted in accordance with the FLEX™ family of protocols at each said encoder output.

7. The two-way system of claim 5 wherein said pager protocol frames are frames formatted in accordance with the REFLEX™ two-way protocol.

8. The two-way system of claim 7 wherein said encoding system comprises a plurality of encoders, each said encoder having one of said plurality of simultaneously active outputs on the same frequency of channels, any selected one of said pager receivers being accessible or inaccessible via any one of said plurality of channels depending on a location of said selected one of said pager receivers, a method for allocating paging messages among channels, said method comprising steps of:

maintaining a location database recording angular locations of said plurality of pager units relative to said transmitter site;

receiving a plurality of pager messages addressed to particular ones of said pager receivers; and assigning channels and transmission times to said plurality of pager messages responsive to locations of said plurality of pager receivers as recorded in said location database.

9. The two-way system of claim 5, said encoding system outputting said pager protocol frames via a plurality of simultaneously active outputs in accordance with said transmission times assigned by said switch.

10. The two-way system of claim 9 further comprising:

a switching matrix having an input for each of said plurality of simultaneously active outputs of said encoding system and an output for each of said plurality of active outputs, said switching matrix connecting inputs to outputs in accordance with said active outputs assigned by said switch.

11. The two-way system according to claim 5 wherein the encoding system includes queuing system responsive to pre-existing protocol handshake information for compensating for latency between transmitted frames and received frames.

12. The two-way system according to claim 11 wherein the protocol handshake information is further employed to provide current updates of relative angular location of said pager units.

13. For use in a two-way pager network system wherein a plurality of pager receivers are directly accessible from a common pager transmitter site via a plurality of channels, any selected one of said pager receivers being accessible or inaccessible via any one of said plurality of channels depending on a location of said selected one of said pager receivers, a method for allocating paging messages among channels, said method comprising steps of;

maintaining a location database recording angular locations of said plurality of pager units relative to said transmitter site;

receiving a plurality of pager messages addressed to particular ones of said pager receivers; and assigning channels and transmission times to said plurality of pager messages responsive to locations of said plurality of pager receivers as recorded in said location database.

\* \* \* \* \*